United States Patent
Ramsauer

[11] 3,892,200
[45] July 1, 1975

[54] AQUARIUM HOUSING

[76] Inventor: Larry R. Ramsauer, 5862 Paddon Cir., San Jose, Calif. 95123

[22] Filed: Apr. 29, 1974

[21] Appl. No.: 465,128

[52] U.S. Cl. .................................. 119/5; 119/5
[51] Int. Cl. ............................ A01k 64/00
[58] Field of Search ................. 119/5; 210/169

[56] References Cited
UNITED STATES PATENTS
| | | | |
|---|---|---|---|
| 1,803,571 | 5/1931 | Ulman | 119/5 UX |
| 2,674,574 | 4/1954 | Pettas | 119/5 X |
| 3,477,580 | 11/1969 | Willinger | 119/5 X |
| 3,487,935 | 1/1970 | Lovitz | 119/5 X |

Primary Examiner—Hugh R. Chamblee
Attorney, Agent, or Firm—Schatzel & Hamrick

[57] ABSTRACT

The invention relates to a decorative housing for use in an aquarium for receiving existing aquarium equipment, such as heaters, filters and aerators and for allowing the received equipment to operate correctly while effectively hiding the received equipment from view of the aquarium.

10 Claims, 8 Drawing Figures

PATENTED JUL 1 1975  3,892,200

AQUARIUM HOUSING

BACKGROUND OF THE INVENTION

1. Field of the Invention

The invention relates to a decorative housing unit for use in aquariums.

2. Prior Art

In every tropical fish aquarium there exists certain equipment necessary to heat, filter and aerate the water. The heater unit often takes the form of a glass tube filled with electrical hardware. This heater tube extends down into the water and is mounted to the top of the tank. Further, it is usual to see employed in most aquariums air lines for supplying air to various aerating devices in the aquarium and to air operated filters inside the aquarium. These lines are usually made of three-sixteenth inch or smaller diameter clear vinyl tubing. Finally, there are three basic types of filters used in aquariums. First, there is the outside-the-tank filter which employs one or two (depending on filter size) clear plastic suction tubes to draw water out of the tank and into the filter and another clear plastic tube to return the filtered water back into the tank. The tubes acting as the suction tubes usually have a clear or colored plastic strainer attached so as to prevent fish specimens from being drawn into the filter. The plastic tubes used in this type of filter can vary up to about one inch in diameter. The second type of filter is the under-the-gravel filter which draws water downward through the gravel on the bottom of the tank to filter the water. This filter employs one or more plastic stand pipes, attached to the filter base located under the aquarium gravel and connected to an air supply by one of the forementioned clear plastic air lines. The stand pipes may have a container of activated carbon or charcoal attached to remove certain impurities from the water exiting the undergravel filter system. The third type of filter is the tank box filter. This filter consists of a clear box containing the filter material and activated carbon or charcoal and has one stand pipe connected in the same manner as did the under-the-gravel filter, to draw water down into the filter box and out through the stand pipe.

These devices and their necessary connections detract from the natural appearance of the aquarium and therefore present a problem to the aquarium enthusiast. Another problem encountered in large aquariums with larger classes of fish is that when the glass type heater is used, the fish can break the glass tubes by forcing them against the side of the aquarium or nearby decorative rocks.

To solve these problems, two different approaches have been used. First, aquariums were designed with bottom compartments for housing the equipment and all access to the aquarium was made through ports designed into the bottom of the tank. This solution added significantly to the cost of the aquarium and required the use of one or more of the devices designed into the aquarium itself. If the enthusiast already owned these devices, he found himself duplicating equipment with the inherent duplication of cost. The second class of solutions was to place each type of device in its own decorative housing. This solution did not account for the necessary tubing and/or wiring necessary to operate each of these devices such that the tubing and/or wiring were still visible inside the aquarium. One specific solution in this class was to embed a heater and an aerator into a body having a decorative front facade. The body acted as a backdrop for the aquarium and was to supply both the heating and aerating functions. This solution however requires that one of the viewing sides of the aquarium be lost from use as well as requiring the duplication of equipment with the additional cost, and did not provide for the necessary filtering of the aquarium.

SUMMARY OF THE INVENTION

It is therefore an object of this invention to provide a decorative housing capable of receiving and allowing proper operation of any combination of aquarium devices.

It is another object of the invention to provide a decorative housing that is pleasing to the eye when viewed from any viewing side of the aquarium.

Finally, it is an object of the invention to provide a decorative housing for an aquarium that will allow the enthusiast to use his present aquarium devices so as to still provide the necessary functions while not incurring any additional cost for those devices.

Briefly, the invention consists of a hollow housing have a decorative exterior. The housing is open at top and bottom to allow the insertion of aquarium devices as well as tubing and/or wiring into the top of the housing from outside the aquarium and to allow the passage of the inserted tubing and/or writing to exit through the bottom of the housing and into the gravel bottom of the tank aquarium for proper routing. The housing has small openings in the upper and lower one-third of the rear portion of the housing to allow the free flow of water through the housing. Finally, a port is provided in each side of the housing to allow the enthusiast to observe if a heater, if inserted into the housing, is operating.

An advantage of this invention is that it provides the enthusiast with a means for inserting and routing otherwise detractive equipment and/or tubing and/or wiring into his aquarium without causing him in any way to duplicate his already made investment in aquarium equipment.

A further advantage is that it provides a protection for fragile equipment which otherwise might be damaged by larger fish.

Still a further advantage is that the invention provides a decorative exterior when viewed from all four sides and does not require a large portion of the aquarium.

The foregoing and other objects of the features and advantages of the invention will be apparent from the following more particular description of the preferred embodiment of the invention, as illustrated in the accompanying drawings.

DESCRIPTION OF THE PREFERRED EMBODIMENT

Figure 1:
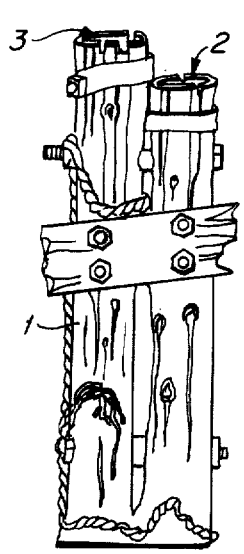
FIG. 1 is the front view of the preferred embodiment of the invention.

The aquarium housing of the invention is shown in the decorative form of an underwater piling consisting of two logs held together by a cross beam. FIG. 1 shows the front view of the aquarium housing 1. Two orifices 2 and 3 are shown, one orifice is associated with each log of the aquarium housing 1. Similar orifices not shown in this figure are provided at the bottom of the aquarium housing 1; again one orifice is associated with each log. Orifices 2 and 3 are of sufficient diameter to allow standard glass tube type heaters, electrical type wiring and normally used size plastic tubing and filter suction tubes to be passed through the orifices 2 and 3 and into the inside of the aquarium housing 1.

Figure 2:
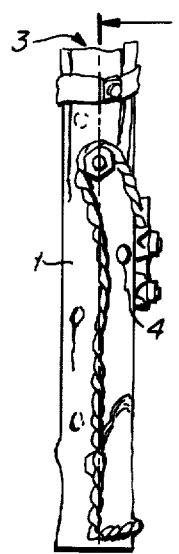
FIG. 2 is the side view of the preferred embodiment of the invention.

FIG. 2 shows the side view of the decorative aquarium housing 1 and specifically shows a port 4. Port 4 passes into the inner aquarium housing structure and is so provided as to allow the light associated with glass tube type heaters to be so seen through port 4. It is not necessary for the light associated with the heater to be aligned with port 4 since the light is concentrated within the housing and will be visible through port 4 regardless of the relative position of the light source with reference to port 4.

Figure 3:
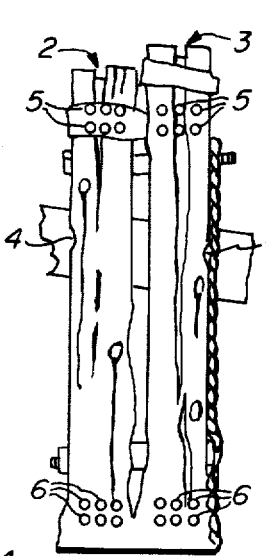
FIG. 3 is the rear view of the preferred embodiment of the invention.

FIG. 3 shows the rear view of the decorative aquarium housing 1. Here is shown that a port 4 is associated with each log to allow the glass tube type heater unit to be installed in either orifice 2 or 3 of aquarium housing 1 and the light from that heater still to be seen. Along the upper portion of both logs of the aquarium housing structure there is a series of small inlet holes 5. Along the bottom portion of both logs of the aquarium housing structure there is again a series of small holes 6. Holes 5 and 6 pass through the outer walls of the aquarium housing structure to allow the free flow of water to be circulated through the aquarium housing 1 to allow proper operation of any heater or filter being operated inside aquarium housing 1. In many aquariums, a backdrop is used to hide the out-of-the-tank equipment from sight, resulting in the elimination of one viewing side. While in the preferred embodiment the rear side is decorative, it should be realized that the rear side need not be decorative if it is to be used in conjunction with a backdrop. However, in all cases, the aquarium housing 1 allows a decorative exterior to be presented to all viewing sides.

Figure 4:
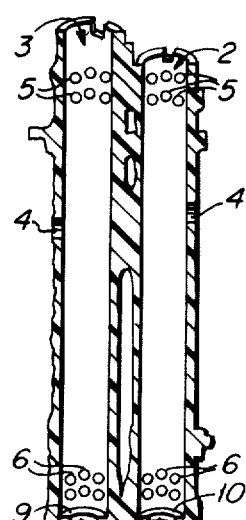
FIG. 4 is a cross-sectional view of FIG. 2 along line 4—4 and shows the internal structure of the preferred embodiment of the invention.

FIG. 4 shows a cross-sectional view of the aquarium housing 1 along line 4—4 of FIG. 2. Here it can be seen that aquarium housing 1 is hollow. Further, it can be seen that the internal cavities of the two logs are connected together. Although this internal connection need not be done, it was found that the internal connection does allow a better flow of the aquarium's water to pass through the aquarium housing. The two series of flow holes 5 and 6 are shown as extending into the cavities of the two logs. Here is also shown the two bottom orifices 7 and 8 of the aquarium housing 1 as mentioned with regard to FIG. 1. Bottom orifices 7 and 8 are slightly smaller in diameter than top orifices 2 and 3. This difference in size allows lips 9 and 10 to be formed at the bottom of each log respectively. Lips 9 and 10 are used as a means of providing additional stability to the structure when the aquarium housing 1 is submerged in water. Finally, FIG. 4 shows ports 4 passing through the wall of aquarium housing 1.

Figure 5:
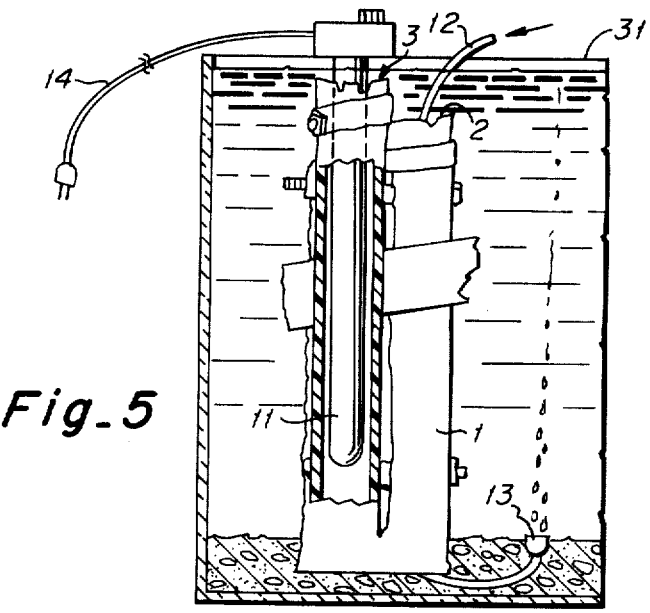
FIG. 5 shows the invention used in a first example.

FIG. 5 shows a partially exposed view for demonstrating how aquarium housing 1 receives and protects a glass tube type heater 14. The heater 14 is mounted to the top of the aquarium 31 in the standard manner. The aquarium housing 1 is so placed so as to receive the glass tube 11 of heater 14 through orifice 3. Since the cavity of the aquarium housing is filled with water, the heater transfers heat to the water in its normal manner without any loss of efficiency and heat is transferred to the aquarium both through the side walls of aquarium housing 1 and by heated water exiting aquarium housing 1 through flow holes 5 and 6. A plastic air hose 12 is shown as passing through aquarium housing 1 by entering orifice 2 and exiting through bottom orifice 8 into the gravel for routing to aerator 13. This figure demonstrates how the aquarium housing 1 can be used to allow the necessary aquarium devices to be inserted into aquarium 31 while allowing no visual detraction of the aquarium itself.

FIG. 6 is again a partially exposed view of aquarium housing 1 for demonstrating how the housing can be used to house the visible components of an under-the-gravel type filter. The under-the-gravel type filter is comprised of filter base 27 which is covered with gravel which acts as the filter medium. Stand pipe 15 is connected to a container 16 of activated charcoal or carbon. Air line 18 is connected to plastic tubing 17 to provide air pressure input to stand pipe 15 necessary for the filter to operate.

Figure 6:
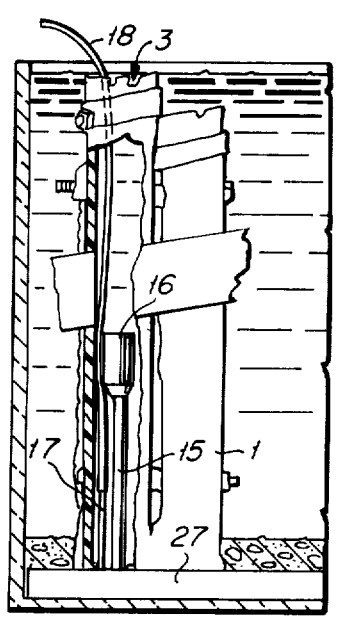
FIG. 6 shows the invention used in a second example.

While FIGS. 5 and 6 have shown each type of equipment being in a separate part of the cavity of aquarium housing 1, such placement is not mandatory. Sufficient room is provided to pass all the mandatory equipment and its hosing and wiring to operate all the equipment shown in these figures through one set of orifices of the aquarium housing 1. The selection of which devices should be placed into the housing through which orifice is a matter of choice which the aquarium enthusiast will make when designing his aquarium. The number of aquarium housing used is again a matter of choice.

Figure 7:
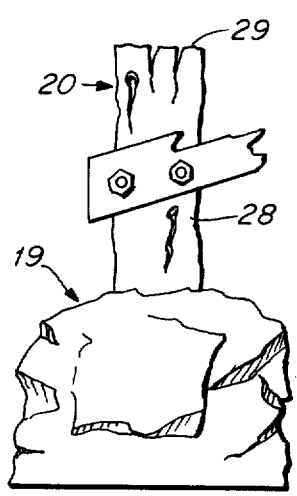
FIG. 7 shows an alternate form of the preferred embodiment of the invention.

FIG. 7 shows an alternative form of the aquarium housing designed to house an in-the-tank type box filter. This aquarium housing 20 has an elongated portion 28 which terminates with orifice 29 and a broad base portion 19. Here the elongated portion 28 is shown as a single log having its base set into rock, the base portion 19. Here again other decorative exteriors can be used.

Figure 8:
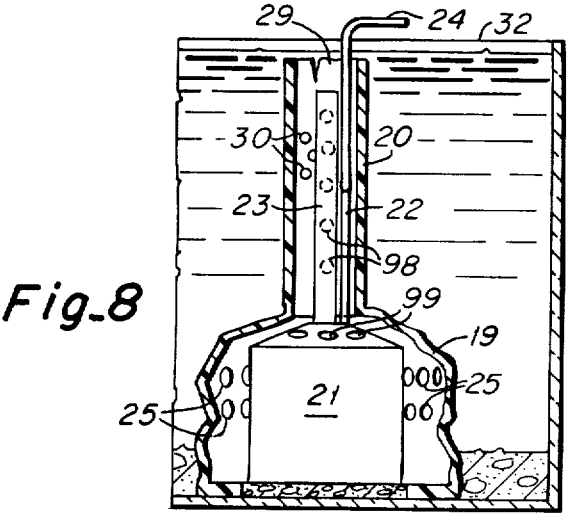
FIG. 8 shows a cut-away portion of the alternate form of FIG. 7 to show how the alternate form is used to accommodate an in-the-tank type box filter.

FIG. 8 is an exposed view of aquarium housing 20 demonstrating how the housing can be used to house a tank type box filter. The tank type box filter is comprised of a box of filter material 21 with air line connection 22 and stand pipe 23. The base portion 19 passes over the filter box 21 causing the stand pipe 23 and air line connection tube 22 to enter into the elongated portion 28 of the aquarium housing 20. A plastic air line tubing 24 is attached to air line connection tube 22 to supply air pressure to the filter for proper operation. The tubing enters the aquarium housing through orifice 29. Two series of small holes 30 and 25 are provided to allow water to flow through aquarium housing 20. Air bubbles 98 passing through stand pipe 23 draw water through housing 20 and holes 25 and into tank box filter holes 99. Water exiting stand pipe 23 exit housing 20 through orifice 29 and/or holes 30. It should be noted that even though aquarium housing 20 is shown designed for the tank type filter, it is still possible to insert a glass type heater and other tubing and/or wiring that is to be routed into the aquarium 32 through orifice 29. These type of devices and tubing can be used in combination with or in lieu of the tank filter itself. Here again, what is housed by aquarium housing 20 is a matter of choice.

In summary, the aquarium housings 1 and 20 can be used to house existing aquarium devices and to act as a conduit for tubing and wiring for routing throughout the aquarium. The aquarium housing allows proper operation of these devices while maintaining them out of view from the four sides of the aquarium. The aquarium housing hides the detractive forms of the devices and tubing and replaces them with a pleasing decorative form which neither detracts from the aquarium nor takes up an unacceptable amount of aquarium volume. The aquarium housing is designed to accept the existing equipment in the aquarium while taking up only a moderate amount of additional volume. Further, the water level does not have to be such as to cover the top orifices of the aquarium housing because the series of flow hole in the aquarium housing allows the proper water flow while hiding the aquarium equipment below the water line of the aquarium.

Finally, the aquarium housing can be made of any type of material and in the preferred embodiment, the material is plastic. Lips 9 and 10 as shown in FIG. 4 are used to provide a means of stabilizing the structure of the aquarium housing after it has been placed into the aquarium. This stability is gained by an addition of gravel to the bottom of the aquarium housing such that the weight of the gravel acts against lips 9 and 10 so as to hold the aquarium housing solidly against the gravel on the bottom of the tank. It should be noted that since the gravel on the bottom of the aquarium is generally an inch or more thick, the routing of tubing and wiring can still be accomplished while employing the lips for stabilization.

While the invention has been particularly shown and described with reference to the preferred embodiment thereof, it will be understood by those skilled in the art that various changes in form and detail may be made therein without departing from the spirit and scope of the invention.

What I claim is:

1. An aquarium housing for use in an aquarium to house aquarium devices while allowing proper operation of the housed devices and to act as a conduit for tubing and/or wiring being routed from outside the aquarium to a device inside the aquarium, comprising:
   a structure having a decorative exterior, said structure forming at least one internal cavity;
   at least one orifice in the top of said structure for providing device, tubing and/or wiring entry into each of said cavities;
   at least one orifice in the bottom of said structure for providing device, tubing and/or wiring entry into each of said cavities;
   at least one first flow hole in the top one third portion of at least one of the sides of said structure for providing water flow through said cavities;
   at least one second flow hole in the bottom one third portion of at least one of the sides of said structure for providing water flow through said cavities;
   said cavity or cavities acting as a decorative protective housing for aquarium devices placed into the cavity through either said top or bottom orifices;
   said cavity and said top and bottom orifices coacting to form a conduit for tubing and/or wiring to be routed from outside the aquarium to inside the aquarium;
   said first and second flow holes providing proper circulation of water through the cavity to allow the proper efficient operation of heaters and/or filters housed within said cavity.
   said structure hiding the detractiveness of any device, tubing and/or wiring being housed or routed through said structure when being viewed from any viewing side of said aquarium.

2. The aquarium housing as recited in claim 1 wherein said first and second flow holes are on the same side of said structure.

3. The aquarium housing as recited in claim 2 wherein the same side of said structure is the rear side of said structure.

4. The aquarium housing as recited in claim 1 further comprising:
   a port for each cavity in said structure for providing viewing access into said cavity for determining if a heater is operating when a heater is housed in one of said cavities.

5. The aquarium housing as recited in claim 4 wherein said first and second flow holes are on the same side of said structure.

6. The aquarium housing as recited in claim 5 wherein the same side of said structure is the rear side of said structure.

7. The aquarium housing as recited in claim 1 further comprising:
   a lip around each of said bottom orifices for providing additional stabilization of said structure.

8. The aquarium housing as recited in claim 7 further comprising:
   a port for each cavity in said structure for providing viewing access into said cavity for determining if a heater is operating when a heater is housed in one of said cavities.

9. The aquarium housing as recited in claim 8 wherein said first and second flow holes are on the same side of said structure.

10. The aquarium housing as recited in claim 9 wherein the same side of said structure is the rear side of said structure.

* * * * *